(12) United States Patent
Simha et al.

(10) Patent No.: US 10,515,611 B2
(45) Date of Patent: Dec. 24, 2019

(54) PERFORMANCE-BASED GRAPHICS PROCESSING UNIT POWER MANAGEMENT

(71) Applicant: Apple Inc., Cupertino, CA (US)

(72) Inventors: Ashwini Simha, San Jose, CA (US); Bin Lin, San Mateo, CA (US); Christopher T. Weaver, Cupertino, CA (US); Frederick B. Fisher, Los Altos, CA (US); Ramkumar Srinivasan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/982,780

(22) Filed: May 17, 2018

(65) Prior Publication Data
US 2018/0342227 A1 Nov. 29, 2018

Related U.S. Application Data

(63) Continuation of application No. 15/179,599, filed on Jun. 10, 2016, now Pat. No. 9,978,343.

(51) Int. Cl.
*G06T 1/20* (2006.01)
*G09G 5/36* (2006.01)

(52) U.S. Cl.
CPC .............. *G09G 5/363* (2013.01); *G06T 1/20* (2013.01); *G06T 2200/28* (2013.01); *G09G 2330/021* (2013.01); *G09G 2350/00* (2013.01); *G09G 2360/08* (2013.01)

(58) Field of Classification Search
CPC .............. G09G 5/363; G09G 2360/08; G09G 2330/021; G09G 2350/00; G06T 1/20; G06T 2200/28
See application file for complete search history.

(56) References Cited

U.S. PATENT DOCUMENTS

| | | |
|---|---|---|
| 6,734,861 B1 | 5/2004 | Van Dyke |
| 7,969,446 B2 | 6/2011 | Hutchins |
| 2005/0251358 A1 | 11/2005 | Van Dyke |
| 2005/0253856 A1* | 11/2005 | Hutchins ............... G06T 15/005 345/506 |
| 2006/0123423 A1* | 6/2006 | Brenner ............... G06F 9/5083 718/105 |
| 2010/0177105 A1 | 7/2010 | Nystad |
| 2012/0179927 A1 | 7/2012 | Sodhi |
| 2012/0249563 A1 | 10/2012 | Wyatt |
| 2014/0095906 A1 | 4/2014 | Hurd |

(Continued)

*Primary Examiner* — Robert J Craddock
(74) *Attorney, Agent, or Firm* — Blank Rome LLP (57) ABSTRACT

Performance counters provided in a graphics processor unit (GPU) are used to provide values used to make a determination of GPU activity so that power management can be exercised. In preferred embodiments counter values relating to computation unit idle times, computation unit stall times, DRAM bandwidth and computation unit stall times due to a sampler wait are utilized to determine performance level. If performance is above a minimum level but the GPU is above certain idleness determinations provided by those values, the GPU can have portions powered down to reduce power consumption while not having a noticeable effect on operations. Based on the various counter values, portions of the GPU can be turned off or disabled to reduce power consumption without having a noticeable effect on perceived GPU performance.

22 Claims, 10 Drawing Sheets

(56) References Cited

U.S. PATENT DOCUMENTS

2014/0095912 A1* 4/2014 Hurd .................. G06F 1/3234
  713/323
2016/0379337 A1 12/2016 Tsai

* cited by examiner

PERFORMANCE-BASED GRAPHICS PROCESSING UNIT POWER MANAGEMENT

BACKGROUND

1. Field of the Invention

The invention relates to power management of computer components.

2. Description of the Related Art

Power management of computers is important, particularly in battery-powered devices but also in plug-in power devices as well. In battery-powered devices, power management can extend the operating life of the device. In plug-in devices, power management allows reduction in overall energy consumption. In devices with power and/or thermal constraints, power management can also improve performance.

Processors in computing, especially the central processors (CPUs) and the graphics processors (GPUs), are the primary power consumers. GPU power consumption has been increasing due to the demand for improved capabilities, such as higher frame rates in games, particularly with various features such as antialiasing enabled; higher resolution displays, such as 4K or UHD displays; and virtual reality devices. While there are times when the full performance of the GPU is needed, there are many periods when lesser performance is acceptable and not noticeable to the user. However, determination of these lesser performance periods has been difficult to develop for GPUs. Improvements in the determination of performance need will allow reduced power consumption by the GPUs.

SUMMARY

Embodiments according to the present invention monitor performance counters provided in the GPU and based on the values of those counters make a determination that power management can be exercised. In the preferred embodiments counter values relating to GPU busyness, computation unit idle times, computation unit stall times, DRAM bandwidth and computation unit stall times due to a sampler wait are utilized to determine performance level needed. Other counter values that can be used include frequency, cache misses, sampler and texture reads, threads dispatched and commands loaded. Based on the various counter values, portions of the GPU can be turned off or disabled to reduce power consumption without having a noticeable effect on perceived GPU performance.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
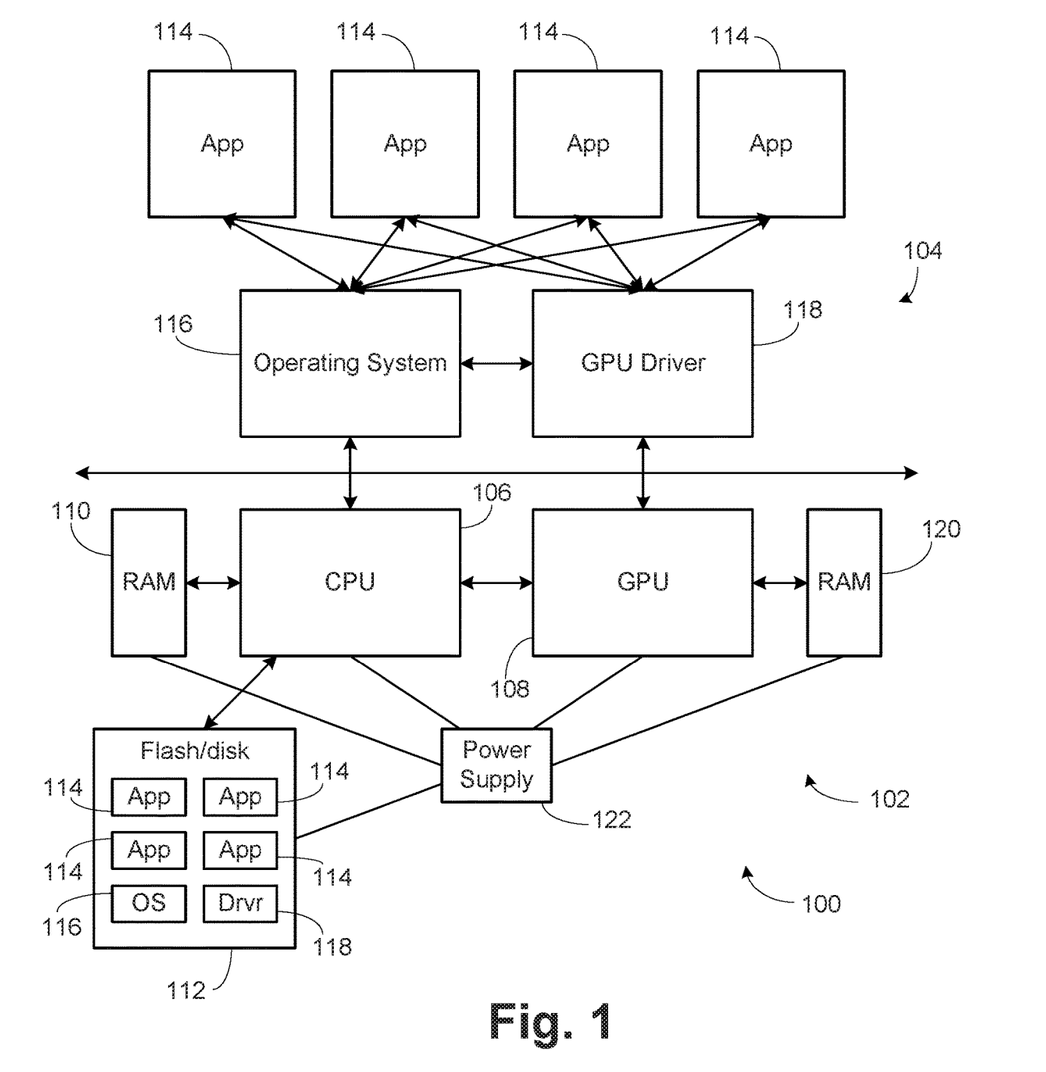
FIG. 1 is a block diagram of a computer system according to the present invention.

FIG. 1 is a block diagram of a computer 100 according to the present invention. A representative hardware environment 102 is illustrated in conjunction with an illustrative software environment 104. The hardware environment 102 includes a CPU or processor 106. Connected to the CPU 106 is a GPU 108. The CPU 106 provides the general computational capabilities of the computer 100, while the GPU 108 provides the graphical processing and output provided to a display (not shown) for the computer 100. While the CPU 106 and GPU 108 are illustrated as separate blocks, in many embodiments such as that shown in FIG. 2, the CPU 106 and GPU 108 are contained in a single component. The CPU 106 is connected to RAM 110 to provide working memory and to nonvolatile memory 112 such as flash memory or disk memory. Contained in the nonvolatile memory 112 are applications 114, an operating system 116 and GPU driver 118. RAM 120 is connected to the GPU 108 to provide the necessary graphics memory. The CPU 106, the GPU 108, the RAM 110, the nonvolatile memory 112 and the RAM 120 are connected to a power supply 122 to provide power to the various components.

The above description is intended to be illustrative and not restrictive. It is understood that many other component designs can be used and that the various components can be on separate chips or integrated into a single chip, or some combination thereof.

The software environment 104 includes the operating system 116, now operating from the RAM 110 as it has been loaded from the nonvolatile memory 112. Similarly, the GPU driver 118 is operating in this software environment 104, as are the applications 114. The operating system 116 and the GPU driver 118 are connected to allow communications between the two so that the operating system can contact the GPU driver 118 to have information displayed on a display. The display can be an internal display, such as in a tablet or a laptop computer, or an external display as in a desktop computer. The applications 114 are connected to the operating system 116 and the GPU driver 118 to allow normal operation both for operating system resources and to provide information for display. It is understood that this is a simplified explanation of the software environment of a computer for purposes of this explanation and many other modules and functions are normally present.

Figure 2:
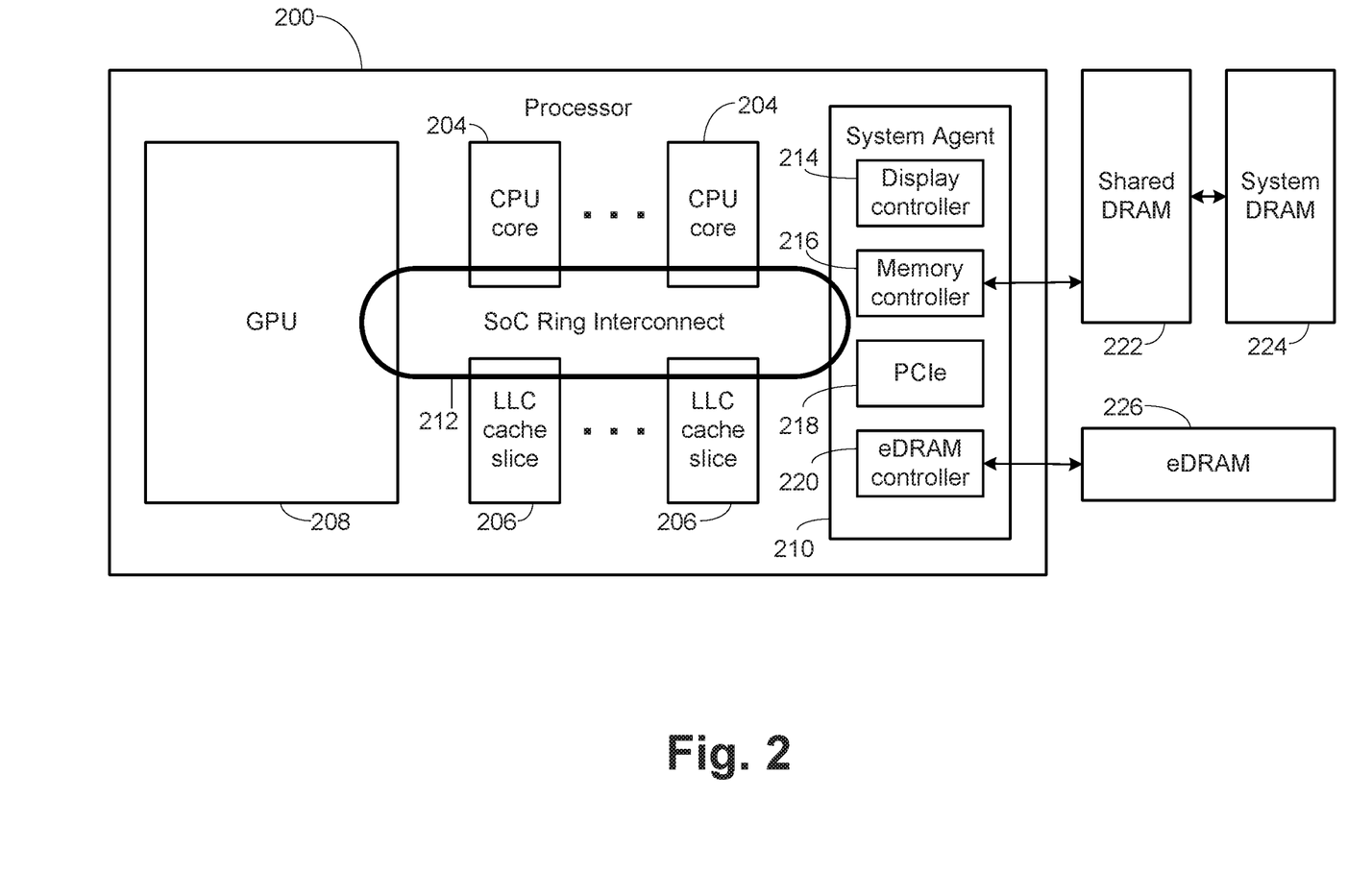
FIG. 2 is a block diagram of an Intel® processor, eDRAM and external DRAM.

FIG. 2 is an exemplary Intel processor and connected DRAM. The Intel processor 200 includes a series of CPU cores 204, a series of cache slices 206, an embedded GPU 208 and a system agent 210. These various components are interconnected by a ring interconnect 212 as is well known in the Intel processor architecture. The system agent 210 in the illustrated case of an embedded GPU includes a display controller 214 to actually provide pixels to the display, a memory controller 216, a PCIe interface 218 and an embedded DRAM (eDRAM) controller 220. The memory controller 216 provides access to both shared DRAM 222 and system DRAM 224. The shared DRAM 222 is used both by the CPU cores 204 and the GPU 208. The eDRAM controller 220 provides access to eDRAM 226, which is RAM dedicated to the GPU 208. System DRAM 224 is RAM dedicated to the CPU cores 204.

Figure 3:
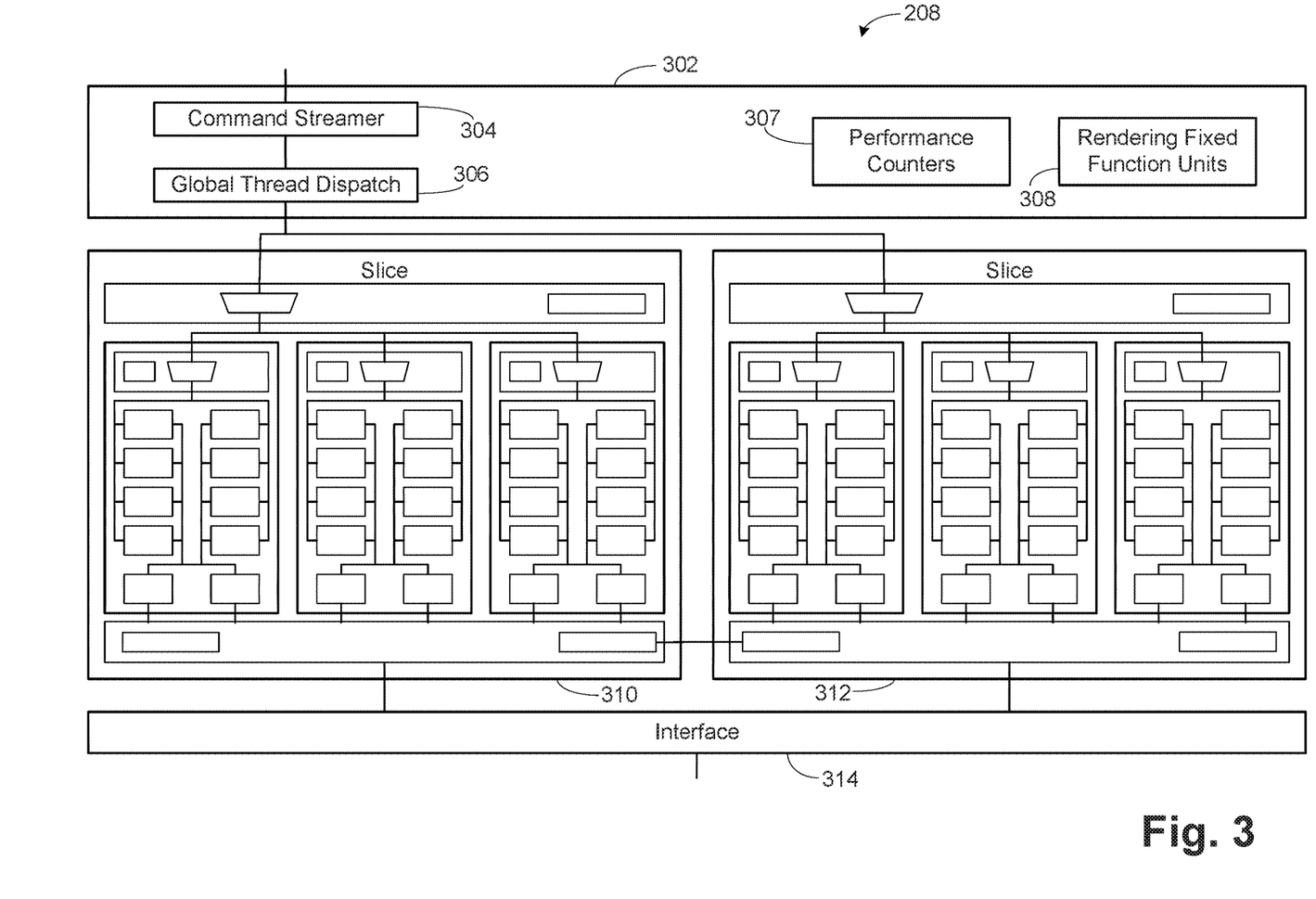
FIG. 3 is a block diagram of the GPU of FIG. 2.

FIG. 3 is a block diagram of the GPU 208. A command and fixed function module 302 receives commands from the CPU cores 204 at a command streamer 304 in the command and fixed function module 302. Commands are provided from the command streamer 304 to a global thread dispatch module 306. The command and fixed function module 302 also contains a series of rendering fixed function units 308, as well known to those skilled in the art. Further, a performance counters module 307 is shown as being in the command and fixed function module 302 by way of illustration. Various counters are provided in the performance counters module 307 and will be discussed in more detail below.

The threads provided by the global thread dispatch module 306 are provided to two slices 310 and 312 in the illustrated embodiment. In various embodiments there can be one slice, two slices or three slices provided in the GPU based on the desired performance characteristics of the particular GPU. Other numbers of slices may be used in the future. The invention is particularly useful when there are multiple slices, such as two or three, in the GPU 208. The slices 310 and 312 perform the desired graphics processing and provide their pixel and data outputs to an interface 314, which is also connected to the interconnect ring 212 so that the display and pixel information can be provided to the shared DRAM 222, the eDRAM 226 and the display controller 214. The data can include actual pixel data to be provided on screen and various operating data as used in the normal operations of the GPU 208.

Figure 4:
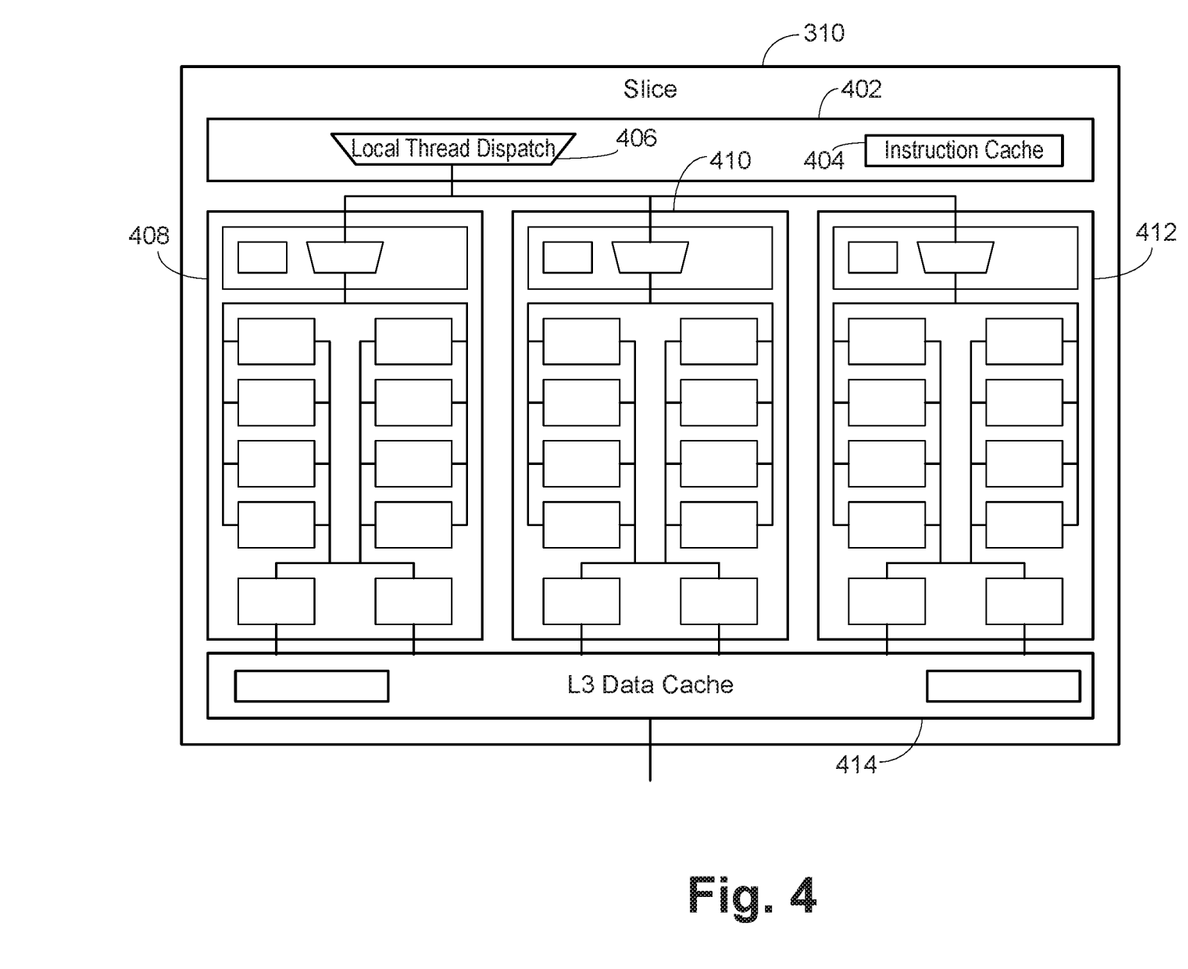
FIG. 4 is a block diagram of a slice in the GPU of FIG. 3.

FIG. 4 is a block diagram of the slice 310 used as an example of a slice. Generally, the slices will be identical, though they need not be so. Slice 310 has a thread and cache module 402. The module 402 includes an instruction cache 404, to cache the various instructions being operated on in the slice 310, and a local thread dispatch unit 406. The local thread local dispatch unit 406 receives the threads provided by the global dispatch unit 306. Connected to the local thread dispatch unit 406 are three sub-slices 408, 410 and 412. In turn, the sub-slices 408, 410 and 412 are connected to an L3 data cache 414. The L3 data cache 414 is connected to the interface 314.

Figure 5:
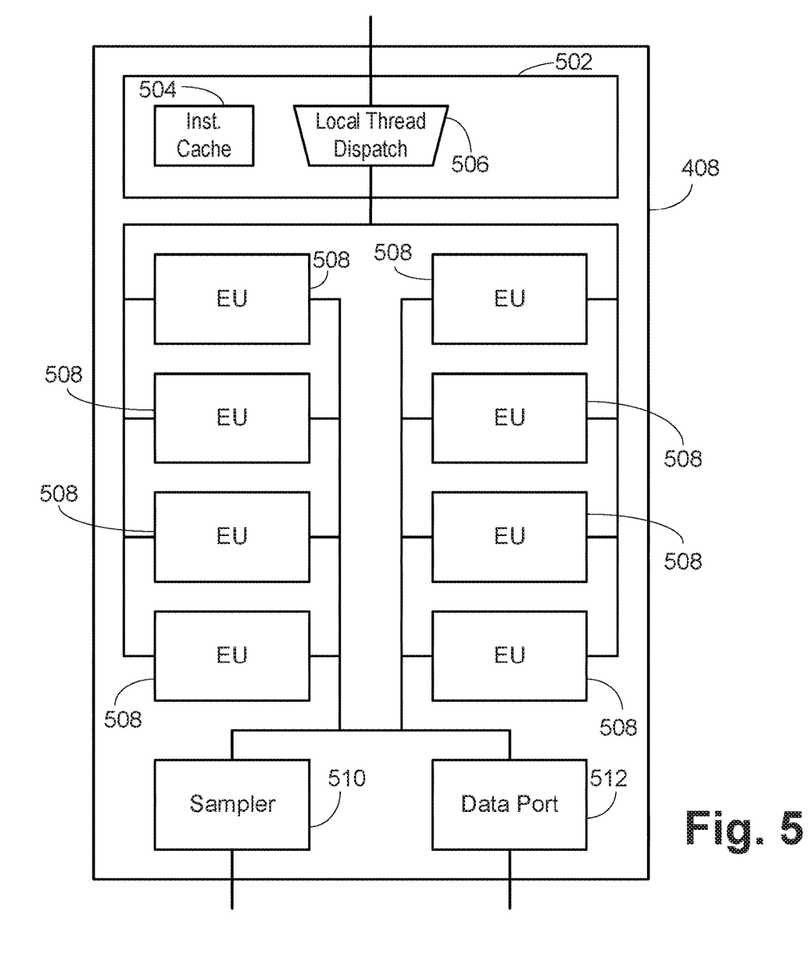
FIG. 5 is a block diagram of a sub-slice of the slice of FIG. 4.

A sub-slice 408 is illustrated in FIG. 5 as exemplary. Again, conventionally all sub-slices are identical but need not be so. The sub-slice 408 includes an instruction cache 504 and a local thread dispatch module 506. Local thread dispatch module 506 receives threads from the local thread dispatch unit 406 of the slice 310. The local thread dispatch module 506 dispatches threads to various execution units (EUs) 508 of the sub-slice 408. The execution units 508 are connected to a sampler 510 and a data port 512 for data transfer. The sampler 510 and the data port 512 are connected to the L3 data cache 414 for data transfer.

Figure 6:
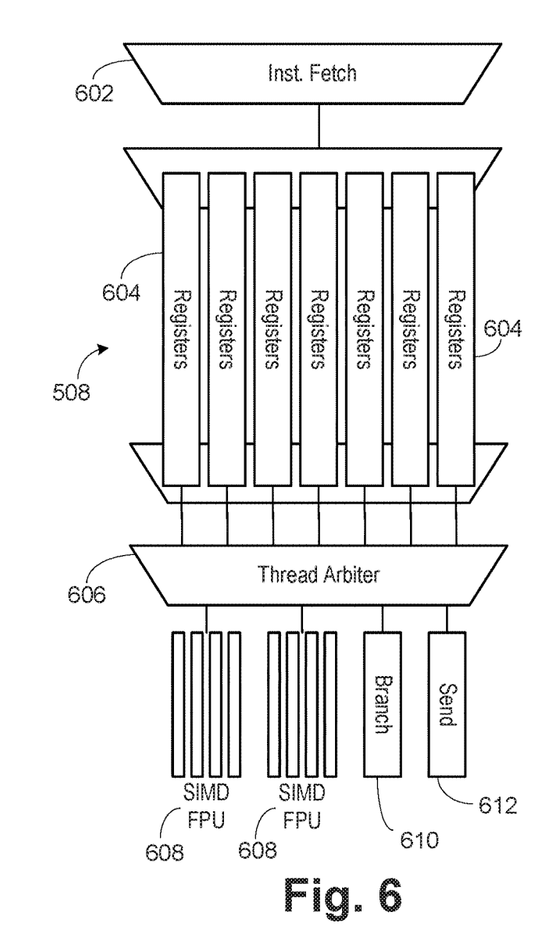
FIG. 6 is a block diagram of the execution unit (EU) of the sub-slice of FIG. 5.

An execution unit 508 is illustrated in the block diagram of FIG. 6. An instruction fetch module 602 receives the threads provided from the local thread dispatch unit 506. The instruction fetch module 602 then cooperates with a series of registers 604, which store the various data to be operated on, and a thread arbiter 606. The thread arbiter 606 determines which threads are ready for processing and issues the appropriate threads to function units of the execution unit 508. The function units in the illustrated embodiment include two SIMD (single instruction multiple data) floating-point units (FPU) 608, a branch unit 610 and a send unit 612. Detailed operation of the particular units described in FIGS. 2-6 are available from documentation from various sources, including from Intel, and are known to those skilled in the art.

Figure 7:
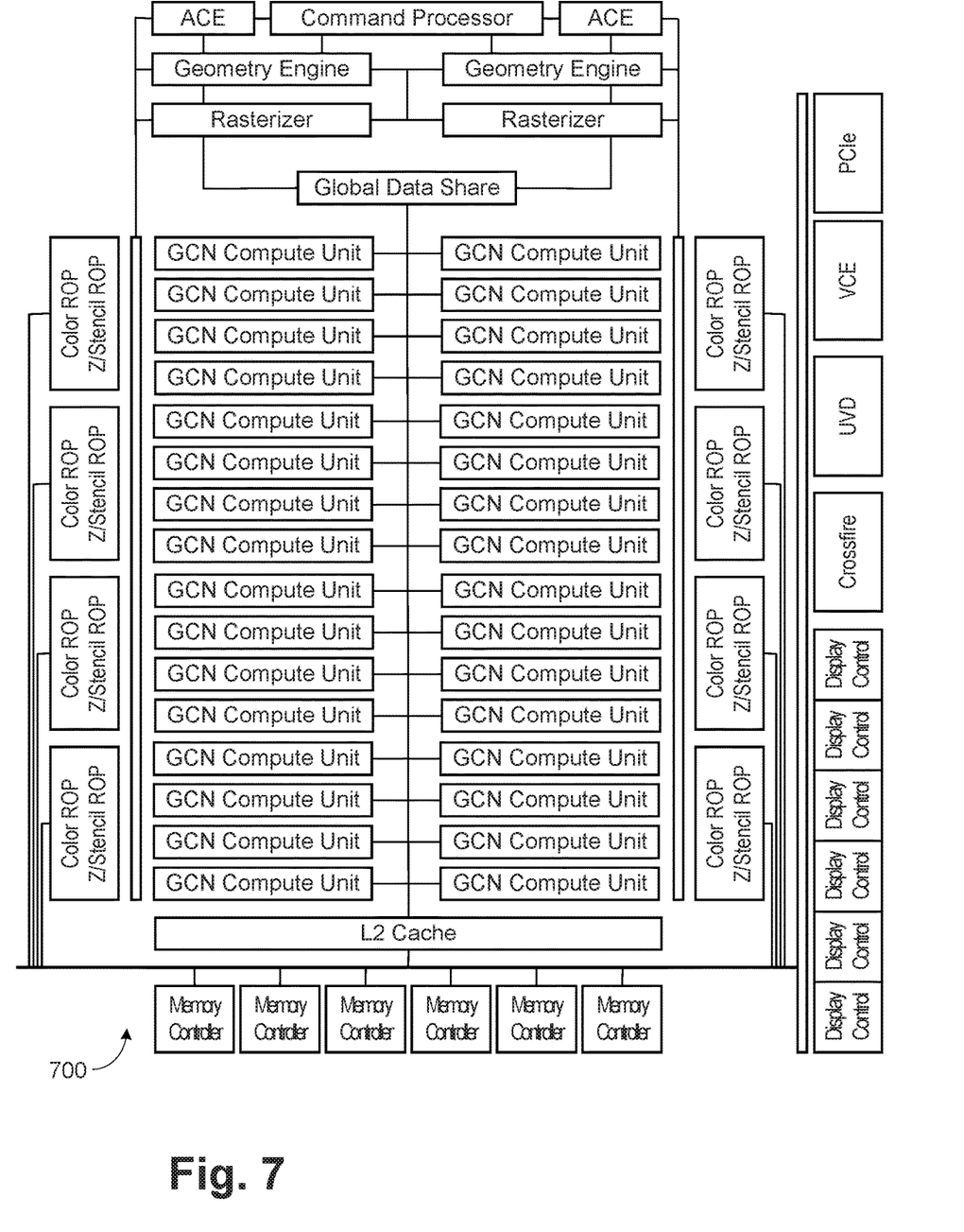
FIG. 7 is a block diagram of a GPU from AMD®.

While the operation of the preferred embodiment operates using an Intel processor and embedded GPU, the invention is also applicable to other GPUs, such as those from AMD and NVIDIA. FIG. 7 illustrates a block diagram of an exemplary AMD GPU 700. As can be seen from FIG. 7, the GPU 700 includes components similar to that of the Intel GPU 208, such as command processors, compute units, caches, memory controllers, display controllers and the like. These units are not discussed here in detail but their operation is known to those skilled in the art and is available from AMD.

Figure 8:
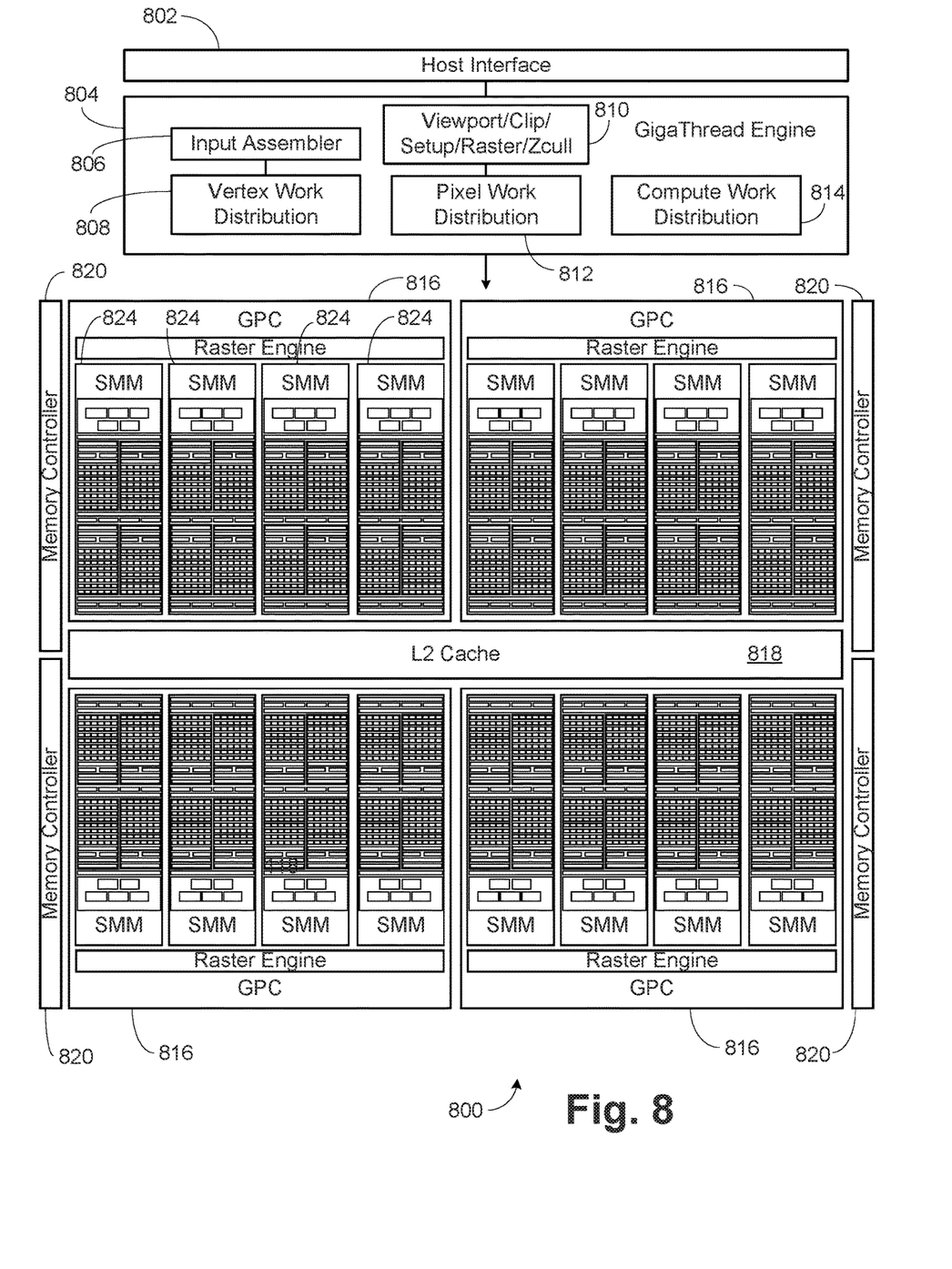
FIG. 8 is a block diagram of a GPU from NVIDIA®.

FIG. 8 is an illustration of an exemplary NVIDIA GPU 800. A host interface 802 receives the commands from the CPU of the particular computer. A GigaThread™ engine 804 performs various operations depending upon the actual state of the data. For initial operations, an input assembler 806 receives the commands and data from the CPU and provides them to a vertex work distribution unit 808. The vertex work distribution unit 808 provides commands and data for processing to the various computational units for vertex operations. After vertex operations are completed, commands and data are provided to a pixel operation unit Bio and then a pixel work distribution unit 812. The pixel work distribution unit 812 provides the particular pixel commands and data to the computation engines. The GPU 800 may also perform general computational functions in addition to graphics processing. For those operations, the commands are provided to a compute work distribution unit 814, which then provides the particular commands as desired to computation units.

In the illustrated embodiment of FIG. 8, there are four graphics processing clusters (GPC) 816, though different numbers of GPCs are used in different NVIDIA GPUs. The GPCs 816 receive the various commands and data from the GigaThread engine 804 and perform the necessary computations. Each GPC 816 is connected to a common L2 cache 818 and to a memory controller 820. The connection of the GPCs 816 to a single L2 cache 818 allows for sharing of data between the various GPCs 816. Each GPC 816 includes a raster engine 822 and a series of SMMs (streaming multiprocessor modules) 824. The SMMs 824 are the next computational block in the GPU 800.

Figure 9:
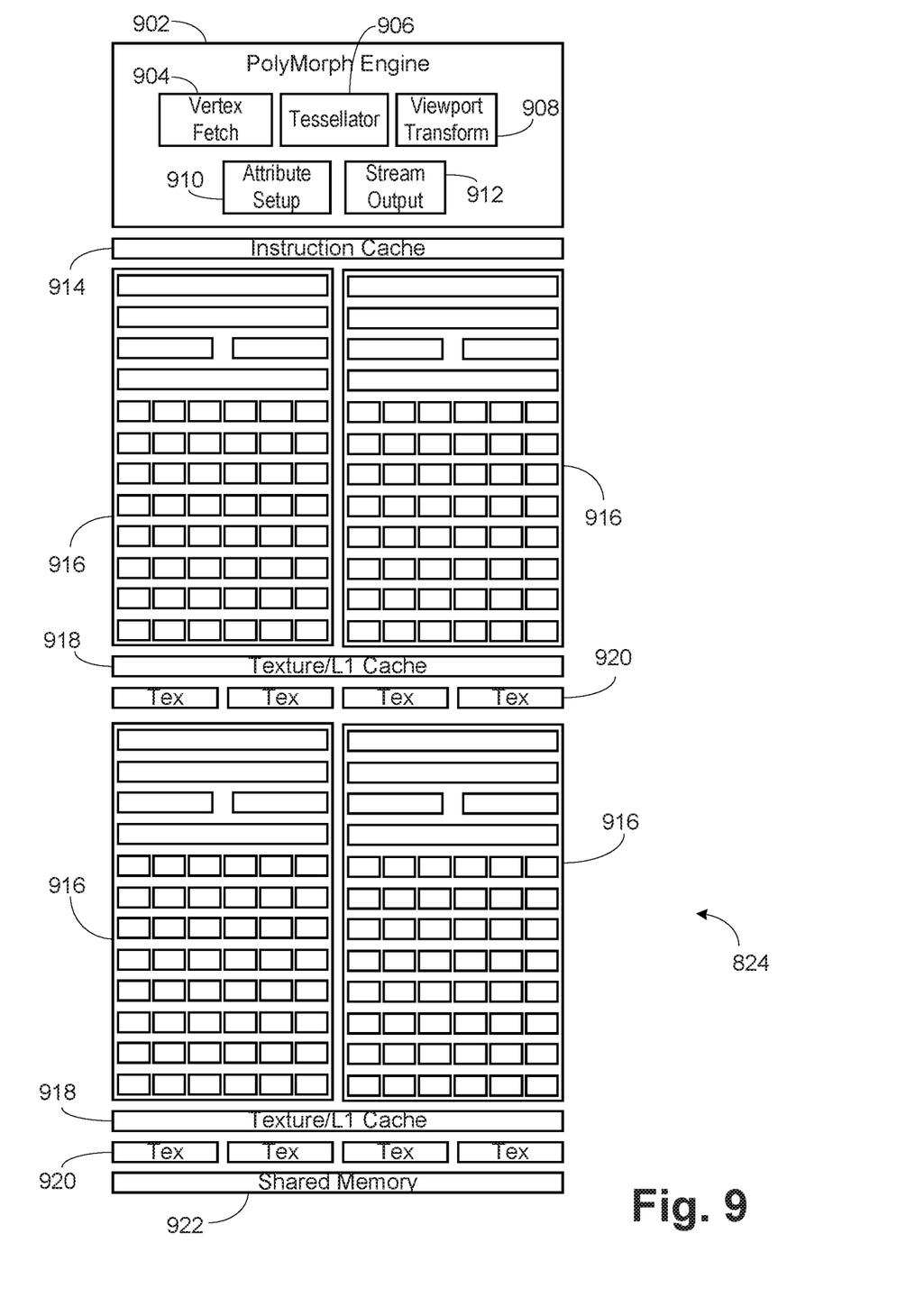
FIG. 9 is a block diagram of a streaming multiprocessor module (SMM) of the GPU of FIG. 8.

FIG. 9 is a block diagram of an SMM 824. Each SMM 824 includes a PolyMorph™ engine 902 which contains various modules such as a vertex fetch module 904, a tessellator 906, a viewport transformer 908, an attribute set up module 910 and a stream output 912. The PolyMorph engine 902 receives the actual commands and data from the GigaThread engine 804. An instruction cache 914 is provided to keep the various processing units operating without stalling. There are a series of streaming multiprocessors (SMs) 916 in the SMM 824. The SMs 916 are the next processing block in the GPU 800. Each set of two SMs includes a shared texture memory/L1 cache 918 and are connected to four texture units 920. A shared memory 922 is provided for use by the four SMs 916. Different numbers of SMs can be present in an SMM if desired, based on the desired performance level and GPU architecture.

Figure 10:
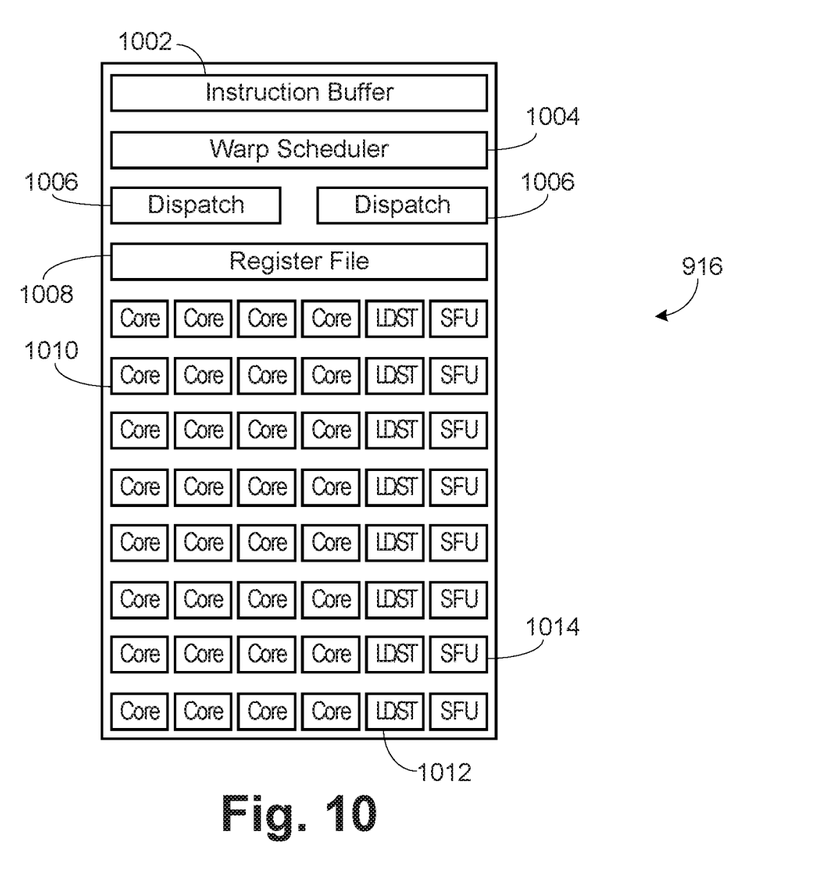
FIG. 10 is a block diagram of a streaming multiprocessor (SM) of an SMM of FIG. 9.

An SM 916 is illustrated in FIG. 10. An instruction buffer 1002 receives the instructions from the instruction cache 914, which has received them from the PolyMorph engine 902, which in turn has received instructions from the GigaThread engine 804. The instructions are provided from the instruction buffer 1002 to a work scheduler 1004. The work scheduler 1004 provides its output to a pair of dispatch units 1006, which dispatch the particular warps to the computational units in the SM 916. A register file 1008 is provided to store data as needed. The SM 916 includes a series of core processing blocks 1010, which are similar to the execution units 508 of the Intel GPU 208. The SM 916 further includes a series of load and store units 1012 to perform load and store operations as necessary. The SM 916 further includes a series of special function units 1014 to perform particular specialized graphics operations as well known to those skilled in the art.

This has been a background description of a series of different GPUs which would be useful for operation according to the present invention.

As known to those skilled in the art, the GPU driver 118 controls operation of the GPU 108. The GPU driver 118 has numerous tasks, including sending commands and data to the GPU 108, but also performs the task of power management of the GPU 108. Because of their complexity, GPUs conventionally consume large amounts of power and thus optimization of their power use is desirable. The GPU 108 includes various counters, such as in performance counter module 307, to monitor the performance and operations of various components inside the GPU 108. These counters provide an indication of the activity level of the various components, such as the execution units, the samplers and the memory controllers. In the preferred embodiments counter values relating to GPU busyness, computation unit idle times, computation unit stall times, DRAM bandwidth and computation unit stall times due to a sampler wait are utilized to determine performance level needed. Other counter values that can be used include frequency, cache misses, sampler and texture reads, threads dispatched and commands loaded. Operation of the preferred embodiments monitor various of these counters as noted above to determine activity level of various components inside the GPU to determine if certain portions of the GPU 108 can be powered down or unclocked to reduce power consumption in the GPU 108 and thus the computer 100. This monitoring is performed in the program 1100 illustrated in FIG. 11.

The program 1100 is contained in the GPU driver 118. Once the operation of the program 1100 is started, the first activity of the program 1100 is to set the two slices 310 and 312 of the GPU 208 to active mode, referred to as GT3 mode in some cases. This detailed description describes operation in a Intel processor having two slices in the GPU. It is understood and will be explained below how operation can occur in various other processors and with other numbers of slices. After setting the two slices active in step 1102, a sampling wait time is provided in step 1104 to allow a period of time to elapse to obtain the next sample of data to provide an indication of the operations of the GPU 108. In the preferred embodiments this period can be set in 10 ms increments from 20 ms to 40 ms. Experimentation of one particular embodiment resulted in a choice of 40 ms as a default sampling interval value. For other configurations different sampling periods and sampling increments may be available and work best for a given embodiment.

Figure 11:
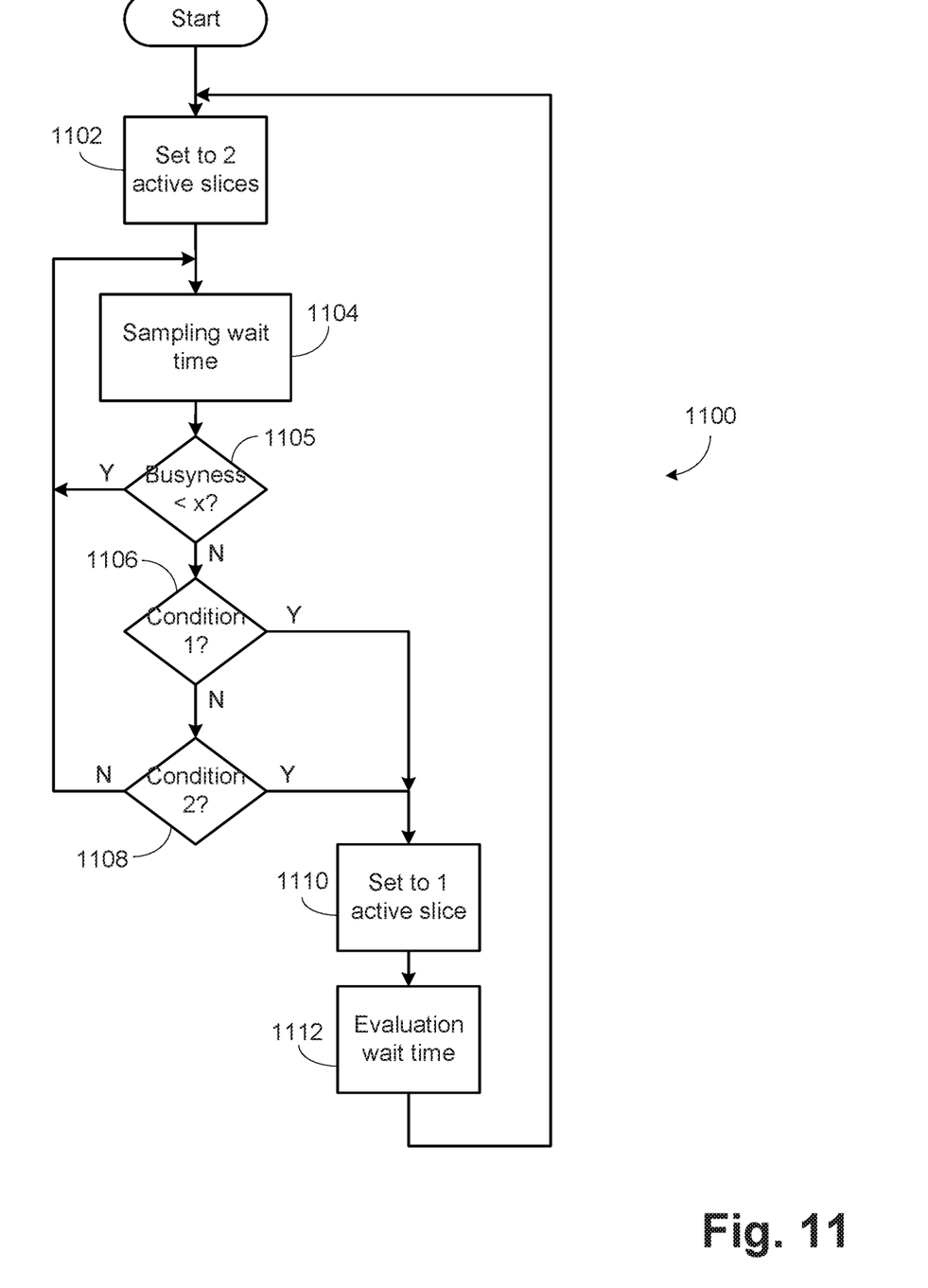
FIG. 11 is a flowchart of operations according to the present invention.

In step 1105 a GPU busyness level is determined. GPU busyness is determined by calculating the percentage of time the GPU spent in active execution over the sample time by monitoring the relevant counters. If the GPU busyness is less than a threshold for a given number of samples, operation simply returns to step 1104. In the preferred embodiment this threshold is set at 30%, but other values can be used. The concern for this determination is that the overhead of switching off a slice and then back on as discussed below might be greater than benefits of having turned the slice off. To provide some level of filtering, all evaluated conditions must be met for a number of samples. For GPU busyness, the GPU busyness level must be equal to or exceed the threshold for that number of consecutive samples. In the preferred embodiments, the preferred number of samples for all evaluated conditions is two, based on experimentation done which evaluated using two, three and four consecutive samples. Of course, other configurations may result in a different number of consecutive samples providing the greatest power savings. Further, for other configurations different filtering algorithms besides the preferred consecutive samples may be used and provide better results.

In step 1106 a first idleness condition is evaluated. The first condition is a determination if the idle times of the EUs exceeds an idle threshold and the GPU DRAM bandwidth is less than a bandwidth threshold. EU idleness is different from GPU idleness. For example, when the GPU is 45% busy, the EUs can be 100% idle because other parts of the GPU are keeping the GPU busy. In a preferred embodiment the idle threshold is 55% and the GPU DRAM bandwidth threshold is 3 GB/sec. As with the GPU busyness evaluation, these thresholds must be met for both samples in the preferred two consecutive sample evaluation set for the first condition to be considered to be met. Therefore, this first idleness condition is a direct determination of GPU idleness.

If the first condition is not met as determined in step 1106, indicating that components of the GPU are busy, in step 1108 a second idleness condition is evaluated. The second idleness condition is to determine that the samplers are sufficiently busy that turning off one slice would slow down operation, as turning off a slice will also turn off samplers. If the samplers are the limiting factor in the GPU operation, it is not desirable to turn any of them off to make the GPU further sampler limited. In a preferred embodiment, the specific conditions are the stall time of the EUs exceeding 60%, the GPU DRAM bandwidth greater than 18 GB/sec and the percentage of EU stalls due to the sampler is less than 40%. As with the GPU busyness evaluation and the first idleness condition, these thresholds must be met for both samples in the preferred two consecutive sample evaluation set for the second condition to be considered to be met. It is understood that these are preferred values for one embodiment and different values, and indeed different metrics, could be used in different embodiments and different GPUs. If the second condition of step 1108 is not met, indicating that the GPU is busy but sampler-bound, control returns to step 1104 to wait another measurement period to perform the analysis again.

If the condition of either idleness condition one in step 1106 or idleness condition two in step 1108 is true, then operation proceeds to step 1110, where only a single slice is set to be active, either slice 310 or 312. This is referred to as placing the GPU in GT2 mode or state. By setting only one slice active instead of two, power consumed by the non-active slice is thus saved and power management of the GPU occurs. In step 1112 a powered down time is allowed to elapse so that the lower power state is maintained for a given amount of time. In the preferred embodiment this time can be 512 ms, 1070 ms or 2140 ms. After experimentation with one embodiment, the powered down time was set at 1070 ms. After this powered down time has elapsed, control returns to step 1102 where both slices are again set active operation for GT3 mode operation and the program repeats.

In this manner the operation of the GPU can be power managed in a simplified manner and yet be accurate based on the operations as defined by the minimum activity level and idleness conditions one and two.

In experiments of one embodiment using the values and conditions discussed above, appreciable power savings were shown with no noticeable or perceived GPU performance loss. If operation with two slices is used as 100%, then in a test using Final Cut Pro-Playback, 86-Text Credit Scroll Best Mode (Best), the power consumed according to the invention was reduced to 92%. In a test using Motion-86-Text Credit Scroll Best Mode: Playback-v4, power consumed was reduced by 12% to 88%. In a test using Motion-Perf: Share Export Movie from Motion (Kyoto)-v4, power was reduced to 92%. Given that power consumed by a GPU such as in the preferred embodiment may consume tens of watts, this reduction of 8-12% provides is appreciable.

Program 1100 as illustrated is only designed to work with two slices in a GPU. If a three slice GPU is used, then multiple conditions can be included and multiple thresholds can be set to allow powering down of one or two slices depending on actual use and demand for the GPU services.

Similar statistics can be determined for AMD GPUs and various numbers of compute units and/or ROP units can be disabled to save power based on desired parameters. The numbers of compute units and ROP units disabled is based on the flexibility of the particular AMD GPU and the various conditions used. Similarly, in NVIDIA GPUs such as in GPU Boo, similar operations and counters can be monitored and selected numbers of GPCs 816 can be activated or deactivated according to the operation according to the present invention, individually or in sets of GPCs.

In this manner by analyzing the actual operation of the particular GPU, a determination can be made whether particular computational units such as slices or graphics processing clusters can be disabled without noticeably hindering performance of the GPU. This disabling allows savings of power, which will extend battery times for battery-powered devices or otherwise keep devices in lower power and cooler modes.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

The invention claimed is:

1. A method of reducing power in a graphics processing unit (GPU) having a plurality of computational modules, the method comprising:
   determining if a busyness of the GPU exceeds a busyness threshold, wherein determining if the busyness of the GPU exceeds the busyness threshold comprises determining a busyness level of the GPU by calculating a percentage of time each of at least two active computational modules spent in active execution during a sample time, and comparing the busyness level to the busyness threshold;
   in response to determining that the busyness of the GPU exceeds the busyness threshold, determining if an idleness of the GPU exceeds an idleness threshold; and
   in response to determining that the idleness of the GPU exceeds the idleness threshold, powering down at least one of the plurality of computational modules for a predetermined time interval.

2. The method of claim 1, further comprising setting at least two of the plurality of computational modules as active and waiting a sampling wait time before determining if the busyness of the GPU exceeds the busyness threshold.

3. The method of claim 2, further comprising setting the sampling wait time and the busyness threshold.

4. The method of claim 2, wherein determining that the idleness of the GPU exceeds the idleness threshold comprises identifying a first idleness condition, wherein the first idleness condition occurs when each of the at least two active computational modules has an idleness level that exceeds a given threshold and when GPU DRAM bandwidth is less than a bandwidth threshold.

5. The method of claim 4, wherein determining that the idleness of the GPU exceeds the idleness threshold comprises identifying a second idleness condition if the first idleness condition is not met, wherein the second idleness condition occurs when sampler activity for each of the at least two active computational modules is below a sampler threshold.

6. The method of claim 5, wherein determining that the idleness of the GPU exceeds the idleness threshold comprises identifying that either of the first and second idleness conditions is met for at least two consecutive samples.

7. The method of claim 1, wherein determining that the busyness of the GPU exceeds the busyness threshold comprises determining the busyness level of the GPU exceeds the busyness threshold for at least two consecutive samples.

8. A non-volatile computer readable medium storing instructions to cause a processor to perform a method of reducing power in a graphics processing unit (GPU), the GPU having a plurality of computational modules, the method comprising:
   determining if a busyness of the GPU exceeds a busyness threshold, wherein determining if the busyness of the GPU exceeds the busyness threshold comprises determining a busyness level of the GPU by calculating a percentage of time each of at least two active computational modules spent in active execution during a sample time, and comparing the busyness level to the busyness threshold;
   in response to determining that the busyness of the GPU exceeds the busyness threshold, determining if an idleness of the GPU exceeds an idleness threshold; and
   in response to determining that the idleness of the GPU exceeds the idleness threshold, powering down at least one of the plurality of computational modules for a predetermined time interval.

9. The non-volatile computer readable medium of claim 8, wherein the method further comprises setting at least two of the plurality of computational modules as active and waiting a sampling wait time before determining if the busyness of the GPU exceeds the busyness threshold.

10. The non-volatile computer readable medium of claim 9, wherein determining that the idleness of the GPU exceeds the idleness threshold comprises identifying a first idleness condition, wherein the first idleness condition occurs when each of the two active computational modules has an idleness level that exceeds a given threshold and when GPU DRAM bandwidth is less than a bandwidth threshold.

11. The non-volatile computer readable medium of claim 10, wherein determining that the idleness of the GPU exceeds the idleness threshold comprises identifying a second idleness condition if the first idleness condition is not met, wherein the second idleness condition occurs when sampler activity for each of the two active computational modules is below a sampler threshold.

12. The non-volatile computer readable medium of claim 11, wherein determining that the idleness of the GPU exceeds the idleness threshold comprises identifying that either of the first and second idleness conditions is met for at least two consecutive samples.

13. The non-volatile computer readable medium of claim 8, wherein the method further comprises setting the sampling wait time and the busyness threshold.

14. The non-volatile computer readable medium of claim 8, wherein determining that the busyness of the GPU exceeds the busyness threshold comprising identifying when the busyness level of the GPU exceeds the busyness threshold for at least two consecutive samples.

15. A computer comprising:
a central processing unit (CPU);
a graphics processing unit (GPU) coupled to the CPU, the GPU including at least two computational modules and configured to have one of the computational modules powered down, each computational module including at least one computational unit;
DRAM coupled to the GPU;
memory coupled to the CPU, the memory including a volatile DRAM portion and a non-volatile computer readable medium; and
a power supply coupled to CPU, GPU DRAM and memory,
wherein the non-volatile computer readable medium stores instructions that cause the CPU to perform a method of reducing power in the GPU, the method comprising:
determining if a busyness of the GPU exceeds a busyness threshold;
in response to determining that the busyness of the GPU exceeds the busyness threshold, determining if an idleness of the GPU exceeds an idleness threshold; and
in response to determining that the idleness of the GPU exceeds the idleness threshold, powering down at least one of the plurality of computational modules for a predetermined time interval,
wherein determining if the busyness of the GPU exceeds the busyness threshold is based on information from counters configured to monitor an activity level of each computational unit, and wherein the busyness threshold ensures that an overhead of powering down and powering up the at least one of the plurality of computational modules is less than a benefit of powering down the least one of the plurality of computational modules for the predetermined time interval.

16. The computer of claim 15, wherein the method further comprises setting two of the plurality of computational modules as active and waiting a sampling wait time before determining if the busyness of the GPU exceeds the busyness threshold.

17. The computer of claim 16, wherein determining that the busyness of the GPU exceeds the busyness threshold comprising determining a busyness level of the GPU by calculating a percentage of time each of the at least two active computation modules spent in active execution during the sampling wait time, and comparing the busyness level to the busyness threshold.

18. The computer of claim 16, wherein determining that the idleness of the GPU exceeds the idleness threshold comprises identifying a first idleness condition, wherein the first idleness condition occurs when each of the at least two active computational modules has an idleness level that exceeds a given threshold and when GPU DRAM bandwidth is less than a bandwidth threshold.

19. The computer of claim 18, wherein determining that the idleness of the GPU exceeds the idleness threshold comprises identifying a second idleness condition if the first idleness condition is not met, wherein the second idleness condition occurs when sampler activity for each of the at least two active computational modules is below a sampler threshold.

20. The computer of claim 19, wherein determining that the idleness of the GPU exceeds the idleness threshold comprises identifying that either of the first and second idleness conditions is met for at least two consecutive samples.

21. The computer of claim 15, wherein the method further comprises setting the sampling wait time and the busyness threshold.

22. The computer of claim 15, wherein determining that the busyness of the GPU exceeds the busyness threshold comprising identifying when the busyness level of the GPU exceeds the busyness threshold for at least two consecutive samples.

* * * * *